Patented Aug. 22, 1944

2,356,161

UNITED STATES PATENT OFFICE 2,356,161

CHEMICAL PROCESS AND PRODUCTS

Ralph K. Iler, Cleveland Heights, Ohio, assignor to E. I. du Pont de Nemours & Company, Wilmington, Del., a corporation of Delaware No Drawing. Application July 18, 1941, Serial No. 402,995

19 Claims. (Cl. 260—97)

This invention relates to waterproofing compositions and processes for producing them, to processes employing these compositions for increasing the hydrophobic properties of surfaces, and to articles having surfaces of increased hydrophobic character so produced. More particularly, the invention is directed to water-soluble complex compounds of the Werner type in which trivalent nuclear chromium atoms are coordinated with cyclic carboxylic acido groups having at least ten carbon atoms, to processes for making these composiitons comprising effecting contact, in the substantial absence of free water, of cyclic carboxylic acido groups having at least ten carbon atoms with basic trivalent chromium salts of monobasic acids, the basicity of the chromium salts being no greater than about fifty per cent, to processes in which hydrophobic properties of surfaces are increased by effecting contact of such surfaces with solutions of the before-mentioned chromi-nuclear complex compositions, and to articles having increased hydrophobic character by reason of the adsorption of such chromi-nuclear complex compositions upon their surfaces.

Attempts have already been made to use chromium compounds as waterproofing agents, but such procedures do not appear to have found wide commercial acceptance. This is in part explained by the lack of practicable means for applying such compounds to the materials to be waterproofed, particularly where the materials have the extended surfaces characteristic of paper and textiles. The means used for applying a waterproofing agent to such materials must be capable of effecting a considerable and substantially uniform dispersion of the waterproofing agent. Dissolving the waterproofing agent in an inert solvent provides a practicable way to effect such dispersion, and water is obviously the most desirable solvent to use.

Unfortunately, water has not heretofore been a suitable solvent from which to apply chromium-containing materials as waterproofing agents. The chromium-containing materials heretofore available are either water-insoluble, or if water-soluble, are so loosely held by the allegedly waterproofed surfaces that they are readily washed out upon further contact with water. Attempts have been made to apply chromium compounds as suspension in water, but in such methods difficulties are encountered due to settling of the insoluble compounds and to lack of uniformity of distribution of the compounds on the surfaces.

Now I have found that by processes in which contact, in the substantial absence or free water, is effected between cyclic carboxylic acido groups having at least ten carbon atoms and basic trivalent chromium salts of monobasic acids, the basicity of the chromium salts being no greater than about fifty per cent, there may be produced novel, water-soluble complex compounds of the Werner type and that by contact with aqueous solutions of these compositions the hydrophobic properties of surfaces may be increased, the surfaces of increased hydrophobic character so produced being characterized by the presence thereon of adsorbed complex chromium compounds.

The water-soluble waterproofing compositions of my invention are complex compounds of the Werner type and are not to be confused with the normal chromium salts. Thus, a composition of my invention in which the carboxylic acido groups are abietato groups, $C_{19}H_{30}COO-$, differs radically in chemical composition from the normal chromic abietate, as is clearly evident from the fact that normal chromic abietate is insoluble in water. It is possible to explain such observed differences in properties on the basis of structure rather than empirical composition, and Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated thru common groups known as bridging groups. With respect to each chromium atom, each bridging group occupies but a single coordination position, so that an additional five coordination groups may be present on the atom.

In accordance with the above-stated Werner theory, the compositions of my invention may be described as Werner complex compounds characterized by having therein associated with a trivalent nuclear chromium atom a cyclic carboxylic acido group having at least ten carbon atoms. Such acido groups, which for convenience of reference will hereinafter be designated as "functional" acido groups, may be present as simple coordinated groups held by either principal or auxiliary valences, or they may be present as bridging groups between two nuclear chromium atoms. Particular acido groups may conveniently be designated by adding the suffix "ato" to the first portion of the name of the carboxylic acid corresponding to the acido group. For instance, abietic acid gives "abietato" groups, naphthenic acid gives "naphthenato" groups, and naphthoic acid gives "naphthoato" groups.

The fact that the functional acido groups are inside, rather than outside, the coordination spheres of the chromium atoms probably accounts for the solubility of the compositions in water and for their ability to be adsorbed upon surfaces from water solutions. It will be understood that there may be more than one chromium atom within the complex and that the chromium atoms may be held together by bridging groups other than acido groups, so that for each functional acido group there may be several nuclear chromium atoms within the complex, it being necessary only that within the complex there is at least one nuclear trivalent chromium atom coordinated with a functional acido group. Preferably, however, the number of chromium atoms per cyclic carboxylic acido group having at least ten carbon atoms will not be more than about ten.

The nature of my novel waterproofing compositions, their production, and use as waterproofing agents, and the character of the waterproofed articles produced will be better understood by reference to the following illustrative examples, but these examples are to be construed only as expositive and not as limiting.

Example I shows the preparation of a waterproofing composition of my invention in which the functional acido group is an abietato group.

*Example I*

As the source of abietato groups rosin, comprising mainly abietic acid, was used, and as the source of basic trivalent chromium salts of a monobasic acid there was used chromyl chloride, which, although a hexavalent chromium compound initially, was reduced under the conditions of this example to a basic trivalent chromium salt. Effective contact of the abietic acid with the chromyl chloride and its reduction product was obtained by dissolving these reactants in an anhydrous non-reactive solvent, namely, carbon tetrachloride.

In a glass-lined reaction vessel equipped with a stirrer and reflux condenser 101 parts by weight of rosin was dissolved in 1600 parts of anhydrous carbon tetrachloride and the solution was brought to a gentle boil under reflux. A solution containing 103 parts of chromyl chloride dissolved in 400 parts of carbon tetrachloride was then slowly added over a period of one hour with violent agitation. After the chromyl chloride solution was added, the mixture was refluxed for one-half hour. During the course of the reaction the chromyl chloride was reduced to a basic trivalent chromium compound by reaction with a part of the rosin and this trivalent chromium compound coordinated with the remainder of the rosin to form a complex compound of the Werner type.

The reaction product was insoluble in carbon tetrachloride and was removed by filtration. After being dried at 100° C., 214 parts of product were obtained as a dark, brownish-green powder which was completely soluble in alcohol. When an alcoholic solution of the product was poured into a large excess of water so as to obtain about 0.5% of the dry product in the final solution there was obtained a yellowish-green clear aqueous solution. A strip of unsized paper dipped in this dilute solution and thoroughly dried was very well sized and water repellent.

A quantitative measure of the waterproofing power of this aqueous solution was obtained by means of an electrical size-testing device on samples prepared in the following manner: An unsized paper made from two-thirds bleached sulfite pulp and one-third soda pulp and having a thickness of .006 inch was sprayed on one side with the .05% solution until 10 parts by weight of paper had absorbed 5 parts by weight of the solution, the spraying rate being so controlled that all the spray liquid was absorbed by the paper. The paper was then dried by subjecting it to a steam-heated metal surface for 30 seconds, the temperature of the metal surface being about 115° C. After such drying, the moisture content of the paper was about 6% by weight.

The samples so prepared were examined for hydrophobic character by means of an electrical size tester. This tester was devised to indicate the rate of penetration of water thru sized paper and operated upon the principle that while dry paper is an insulator, paper which has been wet thru is a conductor of electric current. The apparatus consisted of a pair of electrodes one of which was slidably mounted above the other in a manner such that a piece of paper could be inserted between the two and that contact between them would be prevented only by this paper. One of the electrodes had a flat horizontal metal surface, while the other consisted of a metal cup with a flat perforated bottom, the cup being connected to the rest of the circuit by an electrical conductor and having a weight mounted upon it in such a manner as to press the cup down firmly upon the flat electrode. These electrodes were connected in an electrical circuit which also comprises source of electric current and a galvanometer, so that when electrical contact was made between the electrodes the current would flow and a deflection of the galvanometer could be observed.

To measure the degree of waterproofness of a piece of paper with this instrument, the dry paper was placed between the two electrodes, the treated surface of the paper being uppermost. A tenth normal sodium chloride solution was poured into the cup electrode. The salt solution made contact with the treated surface of the paper thru the perforated bottom of the cup electrode, and if the paper was not to some extent waterproof the salt solution would immediately penetrate the paper and close the electrical circuit between the electrode by reason of the conductivity of the salt solution. On the other hand, if the paper were waterproof it would resist such penetration by the salt solution. The time required for penetration of the paper, measured from the instant the salt solution was poured into the cupped electrode until deflection of the galvanometer indicated the passage of an electric current, was taken as an indication of the relative waterproofness of the paper.

As measured by this electrical size tester, paper waterproofed as above described with the aqueous solution of the composition of Example I was found to require 102 seconds for penetration, whereas the sample of the untreated paper was penetrated in less than one second. It will be apparent, therefore, that a very considerable increase of hydrophobic character on the surface of the paper had been achieved.

The extremely effective nature of the waterproofing composition of Example I will be appreciated when it is considered that there was present upon the paper only about 5 mg. of waterproofing composition per square foot of treated surface. Moreover, the waterproofing composition was strongly adsorbed on the paper, not being removed even by prolonged soaking of the paper in water.

Instead of the ordinary rosin used in Example I, a rosin hydrogenated so that from about 65 to 75% of the unsaturated bonds have been removed may also be used. The preparation of a waterproofing agent of this invention from such a hydrogenated rosin is shown in Example II.

*Example II*

A solution containing 15.2 parts of partially hydrogenated rosin in 320 parts of carbon tetrachloride was brought to reflux temperature in suitable equipment and there was slowly added over a period of an hour a solution of 15.5 parts of chromyl chloride in 100 parts of carbon tetrachloride. The refluxing was continued for about one-half hour, after which the reaction mixture was evaporated to dryness. There was obtained 29.5 parts of dried product which was substantially completely soluble in methanol. A portion of the methanol solution containing 14% by weight of solids was added to water in such proportions that the final solution contained .1% of the original dry solid. This aqueous solution had powerful waterproofing properties, this being demonstrated by the fact that when a piece of unsized paper was dipped into the solution and thoroughly dried, the surface of the paper was very water repellent and had the appearance of paper which had been well sized with rosin and alum to the extent of 1 or 2% rosin and 2 or 3% alum.

A quantitative measurement of the relative waterproofing ability of the composition of Example II was obtained by means of the test described in Example I employing the electrical size tester. By this test sized paper samples prepared by the method described in Example I were found to require 73 seconds for penetration whereas the untreated paper required less than 1 second, indicating a very considerable increase of hydrophobic character on the surface of the paper.

Products having waterproofing characteristics may also be prepared according to this invention from naphthenic acids having more than 10 carbon atoms. The preparation of a product of this character is shown in Example III.

*Example III*

In this example chromyl chloride was used as the source of chromium atoms, a basic trivalent chromium salt being prepared in situ by reducing chromyl chloride with ethyl alcohol in the presence of suitable acido groups. This was accomplished by dissolving 2.5 parts by weight of ethanol and 3.4 parts of naphthenic acids containing more than 10 carbon atoms in 220 parts of carbon tetrachloride, bringing the solution to reflux temperature, and slowly adding a solution of 9 parts of chromyl chloride dissolved in 50 parts of carbon tetrachloride. The refluxing was continued for one hour, after which the reaction mixture was evaporated to dryness. There was obtained about 12.5 parts of a dark gummy product which was substantially soluble in ethanol. Upon pouring this ethanol solution into water an aqueous solution was obtained containing 0.2% of solids. This aqueous solution was demonstrated to have marked waterproofing properties, samples of paper prepared as described in Example I and measured on the electrical size tester requiring 39 seconds for penetration as compared with the less than one second required for penetration of the untreated paper.

In the preparation of a waterproofing agent according to this invention, one may use as the source of chromium any chromium compound which under the conditions of the reaction gives a trivalent chromium atom which coordinates with the acido groups used. In the foregoing examples, the trivalent chromium was formed in situ by reducing chromyl chloride. Chromic compounds in which the chromium is initially present in the trivalent form may also be used as shown in Example IV.

*Example IV*

In this example effective contact between the reactants was secured by dissolving them in glacial acetic acid. Thus 26.7 parts of chromic chloride the green variety, having the formula $CrCl_3 \cdot 6H_2O$ was dissolved in 100 parts of glacial acetic acide. To this solution was added 32.2 parts of rosin dissolved in 100 parts of glacial acetic acid. The mixture was heated for two days with slow evaporation of the acetic acid, 50 parts by weight of solid residue being obtained. This reaction product was completely soluble in alcohol and upon pouring the alcohol solution into an excess of water a clear green solution was obtained which had strong waterproofing and sizing action on paper. The time required for penetration of this waterproofed paper according to the test described in Example I on the electrical size tester was increased six-fold over the time required for penetration of the untreated paper.

It will be observed that with the exception of the product of Example IV, the foregoing products were prepared under substantially anhydrous conditions. In Example IV also it may be said that the reaction was carried out in the substantial absence of "free water" because the water of hydration of the chromic chloride is not present as "free" water. The term "free water" is used to indicate water not chemically associated with the reactants or product as for instance by hydration or coordination. It is noted that in reactions involving the reduction of a hexavalent chromium compound with an organic reducing agent as shown in Examples I and II there is formed some water of reaction. Under the conditions of such reaction, any water so produced ordinarily coordinates with the chromium compound and is present as free water only momentarily.

When a waterproofing composition is prepared by effecting contact in the substantial absence of free water between a functional acido group and a basic trivalent chromium salt of a monobasic acid in accordance with a process of my invention, it is usually preferable to prepare the basic trivalent chromium salt in situ as shown, for instance, in the foregoing Examples I, II, and III. Basic trivalent chromium salts have marked tendency to coordinate with hydroxyl groups, and, by reason of two chromium atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to produce the basic trivalent chromium salt in the presence of the functional acido groups so that coordination may occur immediately. If desired, however, the basic trivalent chromium salt of a monobasic acid may be separately prepared and the coordination with a functional acido group may thereafter be effected. If the basic chromium salt is separately prepared, it is desirable to hold olation to a minimum by using the basic trivalent chromium salt as soon after preparation as feasible.

The basicity of the trivalent chromium salts of monobasic acids used in preparing the waterproofing compositions of this invention has an important bearing on the products produced. This basicity is ordinarily expressed in terms of per cent. The percentage of basicity of a chromium salt may be defined as a measure of the extent to which hydroxyl ions have replaced the anions of the monobasic acid in the chromic salt. For instance, chromic chloride hexahydrate, $CrCl_3 \cdot 6H_2O$, is a chromic salt of the monobasic acid, hydrogen chloride, having 0 per cent basicity. When a hydroxyl group replaces one of the chlorine atoms, a basic salt,

$Cr(OH)Cl_2 \cdot 6H_2O$, is formed, and since one-third of the anionic groups of the monobasic acid has been replaced, this composition is said to be 33% basic. Similarly, if two of the chlorine atoms have been replaced the compound would be 66.7% basic. In preparing the compositions of this invention, it has been found that the basicity of the trivalent chromium salt should not exceed about 50%, and this is true whether the basic salt is separately prepared as in Example IV or is used as an intermediate compound as in Examples I, II and III. Ordinarily it will be preferred to use compounds having a basicity of from about 15 to 20%, while still more particularly compounds of 25 to 40% basicity may advantageously be employed.

The basic trivalent chromium salt of a type well adapted for use in the processes of my invention may be prepared by heating chromic chloride hexahydrate, whereby hydroxyl groups replace chlorine atoms in the salt and hydrochloric acid is evolved. If such heating of the hexahydrate is carried out in the presence of a functional acido group, coordination between the basic chromium salt and the acido group immediately occurs and a waterproofing composition of this invention results.

When effecting reaction between fused chromic chloride hexahydrate and a functional acido group in accordance with a process of this invention, the functional acido group may be derived from salts or esters containing the acido group as well as from the free acid itself. It can be assumed that the first step in the reaction is a replacement of a chlorine atom with a hydroxyl group to give a basic chromic chloride followed by reaction between this basic salt and a hydrolysis product of the salt or ester of the functional group. Thus, instead of the naphthenic acid of Example III, sodium naphthenate might have been used, the sodium naphthenates presumably hydrolyzing or reacting with the liberated hydrogen chloride to give free naphthenato groups.

In a waterproofing composition of this invention there must be present a functional acido group containing more than 10 carbon atoms, and these carbon atoms must be present in a cyclic structure, but the cyclic structure may comprise a single ring or a number of rings and a portion of the carbon atoms may be present as the side chains. The acidic nature of the group must be due to a carboxyl group, but this may be present either on the cyclic structure directly or on a side chain. Typical, therefore, of the cyclic carboxylic acido groups which may be employed are aryl carboxylic acids such as those having a benzene ring nucleus with carbon chain substitutions on the ring, alpha and beta naphthoic acids, and those having more complicated ring structures such as those derived from phenanthrene. The abietic acid in rosin, being methyl-decahydroretene carboxylic acid may be regarded as being of the latter type. The cyclic group may be a saturated ring such as occurs in cyclodecane and its homologues. The ring structure may be aralkyl, containing an aryl group as a substitution on an alkyl group to which the carboxyl group is attached as in the case of naphthyl, acetic, or proprionic acids. It will be seen, therefore, that the functional acido groups may have any configuration so long as there is present a ring structure and the entire group contains at least 10 carbon atoms.

It is not necessary that the source of the functional acid group be a chemically pure material and in fact substantial economies may be achieved in many instances by employing naturally occurring mixtures of compounds containing functional acido groups or capable of giving functional acido groups. Thus, the naphthenic acids of Example III occur naturally in petroleum and may be a mixture of various homologues.

In order to secure maximum waterproofing ability and at the same time retain a satisfactory degree of water solubility, the ratio of nuclear trivalent chromium atoms per functional acido group within the complex preferably should be from about 1:1 to about 10:1. When two or more nuclear chromium atoms are coordinated with a single acido group within the complex, the chromium atoms may be coordinated with each other thru bridging groups. Various groups may function in this bridging capacity, examples, for instance, being hydroxyl (OH), aquo ($H_2O$), and acido groups, either functional or non-functional.

The groups, other than the functional acido groups, with which chromium atoms are coordinated in the compositions of my invention are of secondary importance only. These groups preferably should be, from the standpoint of valence, either neutral or monovalent. The neutral groups are of course held by auxiliary valence bonds, aquo groups ($H_2O$) being a typical example. The monovalent groups are negative and are typified by such groups as chloro, fluoro, bromo, formato, acetoto and nitrato groups. It will be observed that groups of this type are characteristic of the anions of monobasic acids and that chromium compounds containing them are salts of monobasic acids. In the foregoing examples the use of salts of the monobasic acid, hydrochloric acid, in the preparation of compositions of this invention has been illustrated, but it will be understood that the salts of other monobasic acids may similarly be employed.

The compositions of this invention are relatively soluble in water, but in order to aid their dissolution it may be found desirable to dissolve them in a non-aqueous solvent and then form a water solution by dissolving the non-aqueous solution in water. For the convenience of users, the novel compositions may be offered to the trade in the form of solutions in non-aqueous solvents, such as the ethanol or methanol solutions of the foregoing examples.

When a waterproofing composition of this invention, prepared under anhydrous conditions, is dissolved in water a migration of groups originally coordinated with the nuclear chromium atom may take place. For instance, a chloro group within the chromi-nuclear complex may be replaced by an aquo group, the chlorine so displaced migrating outside of the complex. This kind of rearrangement and the olation thru bridging groups previously discussed may take place simultaneously, so that in some instances the solubility of the composition may be adversely affected upon long standing in aqueous solution. However, the actions take place gradually, so that ample time is ordinarily afforded for the application of the aqueous solutions to waterproofing uses.

My novel complex compounds of the Werner type in which trivalent nuclear chromium atoms are coordinated with cyclic carboxylic acido groups having at least ten carbon atoms are broadly applicable to the problem of increasing the hydrophobic properties of surfaces. This increase in the hydrophobic character of surfaces is produced by effecting contact of the surfaces with aqueous solutions of the complex chromium compounds as, for instance, has been shown in the foregoing examples with respect to paper. This increase in hydrophobic character may amount to changing a normally hydrophilic substance to one which is markedly hydrophobic, or it may merely constitute making more hydrophobic a substance which is normally hydrophobic. The results of applying a waterproofing process of my invention to a material such as paper may be evidenced throughout the material as tho the material had been completely impregnated. However, it appears probable from the relatively small amount of waterproofing agent required that the action is primarily a surface phenomenon. The highly hydrophobic character of the surface produced makes it appear likely that an orientated layer of the waterproofing material is fixed upon the surface of the material waterproofed. According to this theory of my invention, the polar portion of the complex compound becomes fixed to the surface, leaving the non-polar and therefore water-repellent portion of the compound, represented by the functional acido group, as a water-repellent oriented surface layer.

The application of a waterproofing composition of this invention to the surface to be waterproofed is preferably effected by preparing an aqueous solution of the composition and applying this aqueous solution to the surface to be treated, removing any undesired excess, and drying the material so treated. I have found that an aqueous solution containing from about 0.05 to about 2.0 per cent of waterproofing composition is particularly well adapted to produce the desired results, since in this concentration range the distribution of the waterproofing agent is particularly uniform.

A wide variety of surfaces may be given increased hydrophobic character by the processes and compositions of my invention. The compositions are particularly applicable to surfaces which are negatively charged in aqueous solutions at a pH of from about 2 to about 6. Examples of materials which may be waterproofed by the processes of my invention include cellulosic materials, either fibrous such as cotton cloth, linen cloth or paper as shown in the foregoing examples, or non-fibrous such as Cellophane. Further examples are glass, in the form either of sheet glass or fibrous glass cloth, clay, sand, asbestos, asbestos-cement compositions, and materials of similar character. It is interesting to note that the hydrophobic surface imparted to sand by treatment according to a process of this invention, behaves as organophilic surfaces when in the presence of such organic liquids as oil. The consequence of this type of surface upon sand will be readily apparent when it is considered that the flow of oil thru such treated sand in the presence of water is greatly facilitated as compared with untreated sand.

The ability of complex chromium compounds of my invention to impart hydrophobic character to surfaces may also be used to advantage for rendering polymeric materials water-insoluble or water-resistant. For example, polyvinyl alcohol either as sheets or films or as coatings on supported fabrics may advantageously be insolubilized with compositions of my invention such as for instance abietato chromic chloride prepared as in Example I.

The use of complex chromium compounds of the Werner type having a functional acido group as waterproofing agents in accordance with a process of my invention may be facilitated by observing certain precautions. Thus, it should be noted that aqueous solutions of such waterproofing compositions are not permanently stable at a pH above about 3.5, and if used at higher pH values such aqueous solutions should be used as soon as possible after preparation. At a pH above about 6 hydrolysis of the compositions occurs with such rapidity that proper application of the waterproofing agent to hydrophilic surfaces becomes impracticable.

It is also desirable when employing aqueous solution of the waterproofing compositions of my invention to avoid the presence of ions which give precipitates with basic chromic salts. Such ions, for example, as pyrophosphate, silicate, ferrocyanide, sulfate, and other polyvalent anions have undesirable effects. Since there normally is no occasion to have such ions present in waterproofing processes, little trouble is usually encountered in avoiding them.

The increase in hydrophobic characteristics of surfaces obtained by the processes of my invention is usually accompanied by an increase in the organophilic properties of the surfaces. Thus, paper which has been made difficult to wet with water by treatment with a chromi-nuclear complex compound containing a cyclic carboxylic acido group having at least 10 carbon atoms is at the same time made easier to wet with an organic material such as machine oil or wax, even in the presence of much moisture. Important use may be made of this property in processes in which preferential wetting with an organic solvent in the presence of water is desired. For example, wood may be treated to improve the adherence of oil paints in applications where the wood is subjected to exposure to moisture.

My novel water-soluble complex compounds of the Werner type in which trivalent nuclear chromium atoms are coordinated with cyclic carboxylic acido groups having at least 10 carbon atoms have physical and chemical properties which render them valuable for other uses in addition to waterproofing. Thus, the compositions, in addition to making glass cloth water repellent, act as a lubricant for the fibres of the cloth and cause the cloth to be much softer and less brittle. Another use is in the treatment of clay or other siliceous material such as asbestos, sand, sandstone, granite, etc. to render it water-repellent and more readily wetted by oils even in the presence of water. Another use is in the treatment of metals to prevent corrosion. This action may be due in part at least to the preventtion of wetting of the surfaces of the metal. Another use is to treat sands rendering them preferentially wetted by oil for oil well treatment or oil filter treatment. The compounds may also be used in the tanning of hides and skins. A variety of other uses will be apparent to those skilled in the art upon the basis of an appreciation of the foregoing description of the physical and chemical properties of the compounds.

While in the foregoing description of my invention I have shown certain specific waterproofing compositions and processes for making them and certain specific waterproofing processes and waterproofed products, it will be understood that one skilled in the art may employ numerous processes and compositions and produce numerous compositions without departing from the spirit of this invention.

I claim:

1. A composition comprising a complex compound of the Werner type in which a trivalent nuclear chromium atom is coordinated with a carbocyclic carboxylic acido group having at least ten carbon atoms.

2. A water-soluble composition comprising a complex compound of the Werner type in which trivalent nuclear chromium atoms are coordinated with carbocyclic carboxylic acido groups having at least ten carbon atoms, the ratio of chromium atoms to carbocyclic carboxylic acido groups having at least ten carbon atoms being not greater than about 10:1.

3. A water-soluble composition comprising a complex compound of the Werner type in which a trivalent nuclear chromium atom is coordinated with an abietato group.

4. A water-soluble composition comprising a complex compound of the Werner type in which a trivalent nuclear chromium atom is coordinated with a naphthenato group.

5. A water-soluble composition comprising a complex compound of the Werner type in which a trivalent nuclear chromium atom is coordinated with a naphthoato group.

6. A water-soluble composition comprising a complex compound of the Werner type in which trivalent nuclear chromium atoms are coordinated with abietato groups, the ratio of chromium atoms to abietato groups being not greater than about 10:1.

7. In a process for producing water-soluble complex compounds of the Werner type in which trivalent nuclear chromium atoms are coordinated with carbocyclic carboxylic acido groups having at least ten carbon atoms, the step comprising effecting contact, in the substantial absence of free water, of a carbocyclic carboxylic acido group having at least ten carbon atoms with a basic trivalent chromium salt of a monobasic acid, the basicity of the chromium salt being no greater than about fifty per cent.

8. In a process for producing water-soluble complex compounds of the Werner type in which trivalent nuclear chromium atoms are coordinated with carbo-cyclic carboxylic acido groups having at least ten carbon atoms, the step comprising effecting contact, in the substantial absence of free water, of a carbo-cyclic carboxylic acido group having at least ten carbon atoms with a basic trivalent chromium salt of a monobasic acid, the basicity of the chromium salt being no greater than about fifty per cent and the ratio of chromium atoms to acido groups being not greater than about 10:1.

9. In a process for producing water-soluble complex compounds of the Werner type in which trivalent nuclear chromium atoms are coordinated with carbo-cyclic carboxylic acido groups having at least ten carbon atoms, the step comprising reducing chromyl chloride to a salt of trivalent chromium while in contact with a carbocyclic carboxylic acido group having at least ten carbon atoms and in the substantial absence of free water.

10. In a process for producing water-soluble complex compounds of the Werner type in which trivalent nuclear chromium atoms are coordinated with abietato groups, the step comprising effecting contact, in the substantial absence of free water, of an abietato group with a basic trivalent chromium salt of a monobasic acid, the basicity of the chromium salt being no greater than about fifty per cent.

11. In a process for producing water-soluble complex compounds of the Werner type in which trivalent nuclear chromium atoms are coordinated with abietato groups, the step comprising effecting contact, in the substantial absence of free water, of an abietato group with a basic trivalent chromium salt of a monobasic acid, the basicity of the chromium salt being no greater than about fifty per cent and the ratio of chromium atoms to abietato groups being not greater than about 10:1.

12. In a process for increasing the hydrophobic properties of a surface, the step comprising effecting contact of the surface with a complex compound of the Werner type in which a trivalent nuclear chromium atom is coordinated with a carbo-cyclic carboxylic acido group having at least ten carbon atoms.

13. In a process for increasing the hydrophobic properties of a surface, the step comprising effecting contact of the surface with an aqueous solution of a complex compound of the Werner type in which a trivalent nuclear chromium atom is coordinated with a carbo-cyclic carboxylic acido group having at least ten carbon atoms.

14. In a process for increasing the hydrophobic properties of a surface, the step comprising effecting contact of the surface with an aqueous solution of a complex compound of the Werner type in which trivalent nuclear chromium atoms are coordinated with abietato groups, the ratio of chromium atoms to abietato groups being not more than about 10.

15. An article having hydrophobic properties and characterized by the presence on its surface of an adsorbed coating of a complex compound of the Werner type in which a trivalent nuclear chromium atom is coordinated with a carbo-cyclic carboxylic acido group having at least ten carbon atoms.

16. A cellulosic material having hydrophobic properties and characterized by the presence on its surface of an adsorbed coating of a complex compound of the Werner type in which a trivalent nuclear chromium atom is coordinated with a carbo-cyclic carboxylic acido group having at least ten carbon atoms.

17. A siliceous material having hydrophobic properties and characterized by the presence on its surface of an adsorbed coating of a complex compound of the Werner type in which a trivalent nuclear chromium atom is coordinated with a carbo-cyclic carboxylic acido group having at least ten carbon atoms.

18. Polyvinyl alcohol having hydrophobic properties and characterized by the presence on its surface of an adsorbed coating of a complex compound of the Werner type in which a trivalent nuclear chromium atom is coordinated with a carbo-cyclic carboxylic acido group having at least ten carbon atoms.

19. A cellulosic material having hydrophobic properties and characterized by the presence on its surface of an adsorbed coating of a complex compound of the Werner type in which a trivalent nuclear chromium atom is coordinated with an abietato group.

RALPH K. ILER.